(12) United States Patent
Beckhoff et al.

(10) Patent No.: US 12,732,080 B2
(45) Date of Patent: Sep. 8, 2026

(54) METHOD FOR PROCESSING A PLANAR OBJECT WITH THE AID OF A PLANAR DRIVE SYSTEM

(71) Applicant: Beckhoff Automation GmbH, Verl (DE)

(72) Inventors: Johannes Beckhoff, Schloß Holte-Stukenbrock (DE); Felix Schulte, Rietberg (DE)

(73) Assignee: Beckhoff Automation GmbH, Verl (DE)

(*) Notice: Subject to any disclaimer, the term of this patent is extended or adjusted under 35 U.S.C. 154(b) by 267 days.

(21) Appl. No.: 18/744,941

(22) Filed: Jun. 17, 2024

(65) Prior Publication Data

US 2024/0339911 A1 Oct. 10, 2024

Related U.S. Application Data

(63) Continuation of application No. PCT/EP2022/087192, filed on Dec. 21, 2022.

(30) Foreign Application Priority Data

Dec. 23, 2021 (DE) ..................... 10 2021 134 510.3

(51) Int. Cl.
*H02K 41/035* (2006.01)
*B23Q 5/28* (2006.01)
(Continued)

(52) U.S. Cl.
CPC ............. *H02K 41/035* (2013.01); *H02K 1/22* (2013.01); *H02K 3/04* (2013.01)

(58) Field of Classification Search
CPC .... B65G 54/02; H02K 41/031; H02K 41/035; H02K 3/04; H02K 1/22; H02P 25/064; B23P 23/02; B23Q 5/28; B21B 35/10
(Continued)

(56) References Cited

U.S. PATENT DOCUMENTS 4,126,797 A 11/1978 Kling
4,458,227 A 7/1984 Petersen
(Continued)

FOREIGN PATENT DOCUMENTS

DE 102007038845 A1 3/2009
DE 102017131304 A1 6/2019
(Continued)

OTHER PUBLICATIONS

International Search Report and Written Opinion dated Apr. 11, 2023 in connection with International Patent Application No. PCT/EP2022/087192, 18 pages including English translation.
(Continued)

*Primary Examiner* — Burton S Mullins
(74) *Attorney, Agent, or Firm* — Dorsey & Whitney LLP

(57) ABSTRACT

The invention relates to a method for processing a planar object 30 with the aid of a planar drive system 1, wherein the planar drive system 1 comprises at least a stator assembly 3 each comprising a plurality of coil groups 4 for generating a stator magnetic field, a stator surface 5 above the stator assembly 3, and a rotor 100. The rotor 100 comprises a plurality of magnet units 105 for generating a rotor magnetic field, wherein the rotor 100 is movable above the stator surface 5 with the aid of an interaction of the stator magnetic field with the rotor magnetic field in a first direction 21 and/or a second direction 22 parallel to the stator surface 5 and/or is movable in a third direction 23 perpendicular to the stator surface 5, wherein a tool 120 is arranged at the rotor 100, wherein the planar object 30 is arranged between the stator surface 5 and the rotor 100, with the following steps:

energizing the coil groups in such a way that the rotor comprises a predetermined height above the stator surface in the third direction.

energizing the coil groups in such a way that the rotor moves along a predetermined trajectory, wherein the (Continued)

tool and the planar object are in mechanical contact, thereby processing the planar object.

20 Claims, 19 Drawing Sheets

(51) Int. Cl.
*H02K 1/22* (2006.01)
*H02K 3/04* (2006.01)
*H02P 25/064* (2016.01)

(58) Field of Classification Search
USPC ........................................ 700/159; 310/12.06
See application file for complete search history.

(56) References Cited

U.S. PATENT DOCUMENTS

| | | | |
|---|---|---|---|
| 6,097,114 | A * | 8/2000 | Hazelton .................. H02K 7/09 355/72 |
| 6,311,098 | B1 * | 10/2001 | Higasayama ...... G05B 19/4099 711/159 |
| 6,353,273 | B1 | 3/2002 | Heshmat et al. |
| 6,445,093 | B1 | 9/2002 | Binnard |
| 7,886,956 | B2 | 2/2011 | Seyama et al. |
| 9,202,719 | B2 | 12/2015 | Lu et al. |
| 10,116,195 | B2 | 10/2018 | Lu |
| 11,038,410 | B2 | 6/2021 | Brinkmann et al. |
| 11,437,902 | B2 | 9/2022 | Brinkmann et al. |
| 12,040,675 | B2 | 7/2024 | Luthe et al. |
| 2005/0255624 | A1 | 11/2005 | Miyajima |
| 2008/0073561 | A1 | 3/2008 | Butler et al. |
| 2011/0062901 | A1 | 3/2011 | Busch |
| 2012/0098391 | A1 | 4/2012 | Yamasaki et al. |
| 2012/0156898 | A1 | 6/2012 | Kallee |
| 2012/0307476 | A1 | 12/2012 | Masuzawa et al. |
| 2012/0328836 | A1 | 12/2012 | Binnad et al. |
| 2013/0278087 | A1 | 10/2013 | Kimiabeigi |
| 2014/0062236 | A1 | 3/2014 | Taniguchi et al. |
| 2014/0285122 | A1 | 9/2014 | Lu et al. |
| 2015/0301458 | A1 | 10/2015 | Shibazaki |
| 2015/0369216 | A1 | 12/2015 | Kisovec |
| 2016/0099623 | A1 | 4/2016 | Böhm et al. |
| 2016/0194158 | A1 | 7/2016 | Senn |
| 2016/0241173 | A1 | 8/2016 | Prüssmeier et al. |
| 2016/0254722 | A1 | 9/2016 | Yamamoto et al. |
| 2017/0163140 | A1 | 6/2017 | Lu |
| 2017/0179806 | A1 | 6/2017 | Lu |
| 2018/0205304 | A1 | 7/2018 | Lu |
| 2018/0212505 | A1 | 7/2018 | Ding |
| 2020/0223645 | A1 | 7/2020 | Feyrer |
| 2020/0303997 | A1 | 9/2020 | Brinkmann et al. |
| 2020/0304007 | A1 | 9/2020 | Brinkmann et al. |
| 2020/0304008 | A1 | 9/2020 | Brinkmann et al. |
| 2020/0304009 | A1 | 9/2020 | Brinkmann et al. |
| 2020/0304010 | A1 | 9/2020 | Brinkmann et al. |
| 2020/0321846 | A1 | 10/2020 | Brinkmann et al. |
| 2021/0091621 | A1 | 3/2021 | Brinkmann et al. |
| 2021/0091622 | A1 | 3/2021 | Brinkmann et al. |
| 2021/0184612 | A1 | 6/2021 | Prüssmeier |
| 2022/0131426 | A1 | 4/2022 | Prüssmeier |

FOREIGN PATENT DOCUMENTS

| | | | |
|---|---|---|---|
| DE | 102017131314 | A1 | 6/2019 |
| DE | 102017131320 | A1 | 6/2019 |
| DE | 102017131324 | A1 | 6/2019 |
| DE | 102017131326 | A1 | 6/2019 |
| DE | 102018117953.7 | B3 | 11/2019 |
| DE | 102018117981 | A1 | 1/2020 |
| DE | 102017131321.4 | B4 | 3/2020 |
| DE | 102018129731 | A1 | 5/2020 |
| DE | 102019117430 | A1 | 12/2020 |
| DE | 102019117431 | A1 | 12/2020 |
| EP | 2779390 | A2 | 9/2014 |
| WO | 2013059934 | A1 | 5/2013 |
| WO | 2018176137 | A1 | 10/2018 |
| WO | 2019129547 | A1 | 7/2019 |
| WO | 2019129561 | A1 | 7/2019 |
| WO | 2019129562 | A1 | 7/2019 |
| WO | 2019129564 | A1 | 7/2019 |
| WO | 2019129566 | A1 | 7/2019 |
| WO | 2019129576 | A1 | 7/2019 |
| WO | 2020020605 | A1 | 1/2020 |
| WO | 2020020607 | A1 | 1/2020 |
| WO | 2020260564 | A1 | 12/2020 |
| WO | 2020260566 | A1 | 12/2020 |

OTHER PUBLICATIONS

Office Action dated Feb. 9, 2023 in connection with Canadian patent application No. 3,143,896, 5 pages.

Office Action dated Aug. 26, 2023 in connection with Chinese Patent Application No. 202080047214.8, 14 pages including English translation.

International Search Report and Written Opinion dated Sep. 11, 2020 in connection with International Patent Application No. PCT/EP2020/068000, 21 pages including English translation.

Examination Report dated Sep. 10, 2025 in connection with German patent application No. 102019117431.7, 10 pages including English translation.

* cited by examiner 1
21
22
23
7
3
2
100
105
4
6
105
105
3
101
7
2
5
30
25

METHOD FOR PROCESSING A PLANAR OBJECT WITH THE AID OF A PLANAR DRIVE SYSTEM

CROSS-REFERENCE TO RELATED PATENT APPLICATIONS

The present patent application is a continuation of International Patent Application No. PCT/EP2022/087192, filed Dec. 21, 2022, "Method for Machining a Flat Object with a Planar Drive System," which claims the priority of German patent application DE 10 2021 134 510.3, filed Dec. 23, 2021, "Verfahren zum Bearbeiten eines flächigen Objekts mittels eines Planarantriebssystems," the entire disclosure content of each of which is hereby incorporated by reference herein, in the entirety and for all purposes.

FIELD

The present invention relates to a method for processing a planar object with the aid of a planar drive system, and to a planar drive system.

BACKGROUND

Planar drive systems may, inter alia, in automation technology, in particular manufacturing technology, handling technology and process engineering. Planar drive systems may be used to move or position a moving element of a system or machine in at least two linearly independent directions. Planar drive systems may comprise a permanently energized electromagnetic planar motor having a planar stator and a rotor movable on the stator in at least two directions.

In a permanently energized electromagnetic planar motor, a driving force is exerted on the rotor by the fact that energized coil groups of a stator assembly interact magnetically with driving magnets of a plurality of magnet assemblies of the rotor. Planar drive systems having rectangular and elongated coil groups and rectangular and elongated magnet assemblies of the rotor are known from the prior art. Such a planar drive system is e.g. described in DE 10 2017 131 304 A1. With the aid of such a planar drive system, in particular a linear and translational movement of the rotor is allowed for. This means that with the aid of such a planar drive system, the rotor may be moved freely parallel to the stator surface above a stator surface under which the rectangular and elongated coil groups are arranged, and may be moved perpendicularly to the stator surface at least at different distances from the stator surface.

DE 10 2019 117 431 A1 discloses a planar drive system in which a gap is arranged between two stator modules of a stator surface and in which, as the case may be, functional elements are arranged in the region of the gap, with the aid of which a function extending beyond a movement of the rotor may be provided. The functional elements may optionally act upon a rotor of the planar drive system.

DE 10 2018 129 731 A1 discloses a planar drive system in which a two-dimensional virtual potential profile may be used for a path finding of a rotor.

U.S. Pat. No. 6,445,093 B1 discloses a planar drive system in which rotors may be moved in six dimensions, including three spatial directions, and rotated about three axes of rotation. The planar drive system may be used, for example, to process semiconductors.

SUMMARY

The invention provides an improved planar drive system with the aid of which a planar object may be processed. The invention further provides an improved operating method for processing a planar object with the aid of such a planar drive system.

According to an aspect, a method processes a planar object with the aid of a planar drive system. The planar drive system comprises at least a stator assembly comprising in each case a plurality of coil groups for generating a stator magnetic field, a stator surface above the stator assembly, and a rotor, the rotor comprising a plurality of magnet units for generating a rotor magnetic field, the rotor being movable above the stator surface with the aid of an interaction of the stator magnetic field with the rotor magnetic field in a first direction and/or a second direction and/or a third direction, wherein the first direction and the second direction are parallel to the stator surface, wherein the rotor is movable in the third direction perpendicular to the stator surface, wherein a tool is arranged at the rotor, wherein the planar object is arranged between the stator surface and the rotor. The method comprises energizing the coil groups in such a way that the rotor comprises a predetermined height above the stator surface in the third direction, and energizing the coil groups in such a way that the rotor moves along a predetermined trajectory, wherein the tool and the planar object are in mechanical contact, thereby processing the planar object.

According to another aspect, a planar drive system comprises at least a stator assembly respectively comprising a plurality of coil groups for generating a stator magnetic field, a stator surface above the stator assembly, and a rotor, the rotor comprising a plurality of magnet units for generating a rotor magnetic field, the rotor being movable above the stator surface with the aid of an interaction of the stator magnetic field with the rotor magnetic field in a first direction and/or a second direction and/or a third direction, wherein the first direction and the second direction are parallel to the stator surface, wherein the rotor is movable in the third direction perpendicular to the stator surface, wherein a tool is arranged at the rotor, further comprising a controller which is set up to output a first signal, wherein on the basis of the first signal the coil groups are energized in such a way that the rotor has a predetermined height above the stator surface in the third direction and furthermore to output a second signal, wherein on the basis of the second signal the coil groups are energized in such a way that the rotor moves on a predetermined trajectory, wherein the tool and a planar object are in mechanical contact in the process and the planar object is processed as a result.

EXAMPLES

A planar drive system comprises at least a stator assembly having a plurality of coil groups for generating a stator magnetic field. The stator assembly having the coil groups may be arranged in a stator module comprising a stator module housing, whereby a plurality of stator assemblies may be arranged in a stator module. The planar drive system further comprises a stator surface above the stator assembly and a rotor, wherein the rotor comprises a plurality of magnetic units for generating a rotor magnetic field and is movable above the stator surface in a first direction and/or a second direction and/or a third direction with the aid of an interaction of the stator magnetic field with the rotor magnetic field.

The first direction and the second direction are parallel to the stator surface. The rotor is further movable in the third direction perpendicular to the stator surface. Moreover, a tool is arranged at the rotor. The planar drive system further comprises a controller arranged to output a first signal and to output a second signal. Based on the first signal, the coil groups are energized in such a way that the rotor has a predetermined height above the stator surface in the third direction, and based on the second signal, the coil groups are energized in such a way that the rotor moves along a predetermined trajectory, with the tool and a planar object being in mechanical contact, the planar object being processed thereby.

In a method for processing a planar object with the aid of a planar drive system, the planar drive system comprises at least a stator assembly respectively having a plurality of coil groups for generating a stator magnetic field, a stator surface above the stator assembly, and a rotor. The rotor comprises a plurality of magnet units for generating a rotor magnetic field, wherein the rotor is movable above the stator surface in a first direction and/or a second direction and/or a third direction with the aid of an interaction of the stator magnetic field with the rotor magnetic field, wherein the first direction and the second direction are parallel to the stator surface. The rotor is further movable in the third direction perpendicular to the stator surface. A tool is arranged at the rotor, wherein the planar object is arranged between the stator surface and the rotor. An arrangement of the planar object between the stator surface and the rotor may thereby provide that the rotor at least partially covers the planar object.

During processing, the following steps are carried out:

the coil groups are energized in such a way that the rotor has a predetermined height above the stator surface in the third direction.

the coil groups are energized in such a way that the rotor moves along a predetermined trajectory, with the tool and the planar object in mechanical contact, thereby processing the planar object.

In particular, a planar object may comprise an object that has significantly smaller dimensions in the third direction than in the first direction and/or the second direction. The planar object may e.g. be paper, cardboard, a layer of plastic, a glass or a metal sheet. In the latter case, it may particularly be provided that the metal sheet is not ferromagnetic in order not to excessively disturb the interaction of the stator magnetic field with the rotor magnetic field. By arranging the planar object between the rotor and the stator surface, a force of the tool on the planar object may be well controlled, since this force may be well adjusted and/or controlled and/or regulated with the aid of energizing the coil groups and the resulting attraction between the coil groups and the magnet units. Thus, a simple processing method for planar objects is provided. A thickness of the planar object may e.g. be up to 5 millimeters, preferably a maximum of 2 millimeters.

In an embodiment of the method, a magnetic permeability of the planar object is taken into account when the coil groups are energized in such a way that the rotor has a predetermined height above the stator surface in the third direction. The magnetic permeability may either be predetermined on the basis of knowledge about the material, the thickness and/or other properties of the planar object or determined with the aid of a sensor.

In an embodiment of the method, a current intensity of the coil groups is adapted, in particular increased, on the basis of the magnetic permeability of the planar object. By increasing the current intensity, an influence on the interaction of the stator magnetic field with the rotor magnetic field triggered by the magnetic permeability may be at least partially, preferably completely, compensated.

In an embodiment of the method, the coil groups are first energized in such a way that the rotor moves in the third direction away from the stator surface. Subsequently, the coil groups are energized in such a way that the rotor is located above the planar object. Subsequently, the coil groups are energized in such a way that the rotor moves in the third direction toward the stator surface until the tool and the planar object are in mechanical contact. This may serve to determine a thickness of the planar object in the third direction, and the predetermined height may be adjusted during processing based on this thickness. By initially raising the rotor and then lowering it, a simple way is provided to be able to move the rotor at the predetermined height during processing.

In an embodiment of the method, when the coil groups are energized in such a way that the rotor moves along a predetermined trajectory, a predetermined force is compared to a determined force for at least one point of the trajectory, and the energizing of the coil groups is carried out in such a way that the determined force corresponds to the predetermined force. In this way, forces transmitted by the tool in the first direction and/or the second direction and/or the third direction can be set.

In an embodiment of the method, a thickness of the planar object in the third direction is determined and the predetermined height is calculated using the thickness. For this purpose, for example, magnetic field sensors arranged within the planar drive system, which may serve to determine a position of the rotor, may be used.

In an embodiment of the method, the thickness of the planar object in the third direction is determined with the aid of a sensor arranged at the rotor.

In an embodiment of the method, at least one fixation rotor is moved towards the stator surface with the aid of the coil groups in such a way that the planar object on the stator surface is restricted from moving in the first direction and/or second direction and/or third direction with the aid of the fixation rotor. This allows for improved processing of the planar object.

In an embodiment of the method, a force-increasing rotor acts upon the rotor with the aid of at least one force-transmitting unit to increase a force of the tool on the planar object in the third direction. This also allows for improved processing of the planar object.

In an embodiment of the method, the tool comprises a cutting tool. Processing of the planar object comprises cutting.

In an embodiment of the method, the cutting tool comprises a first cutting edge and at least one second cutting edge, the first cutting edge being arranged on a first side of the rotor and the second cutting edge being arranged on a second side of the rotor, the first side and the second side of the rotor being opposite to each other. In order to process the planar object, the rotor may be angled in such a way that either the first cutting edge or the second cutting edge is in mechanical contact with the planar object. This allows for using different cutting edges on one rotor, making the process more efficient overall, since only one rotor is required for two independent cutting operations.

In an embodiment of the method, the tool comprises a punching tool. The processing of the planar object comprises punching.

In an embodiment of the method, the tool has a punch. A stamp bed is arranged on the stator surface. Processing of the planar object includes stamping. The stamp bed may also be referred to as a stamp pad.

In an embodiment of the method, the tool comprises a print head. The processing of the planar object comprises printing. The transfer of a printing material, such as ink, paint, toner or the like, is carried out with the aid of mechanical contact between the tool and the planar object, with the printing material establishing the mechanical contact.

In an embodiment of the method, the tool comprises an adhesive-dispensing nozzle. The processing of the planar object comprises the application of an adhesive. The adhesive is transferred with the aid of mechanical contact between the tool and the planar object, wherein the adhesive establishes the mechanical contact.

In an embodiment of the method, the tool comprises a roller. The processing of the planar object comprises rolling.

In an embodiment of the method, the tool comprises a press. Processing of the planar object comprises pressing.

In an embodiment of the method, the tool comprises a pen. Editing the planar object comprises writing or drawing.

In an embodiment of the method, the tool comprises a driven tool. Processing the planar object comprises drilling and/or milling and/or engraving and/or sawing and/or grinding and/or perforating. The driven tool may be a power tool and have an electric drive. As an alternative or in addition, the driven tool may have a pneumatic and/or hydraulic drive.

In an embodiment of the method, processing the planar object comprises folding. In an embodiment of the method, processing the planar object comprises ironing. In an embodiment of the method, processing the planar object comprises scribing glass. In an embodiment of the method, processing the planar object comprises cutting fabric.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
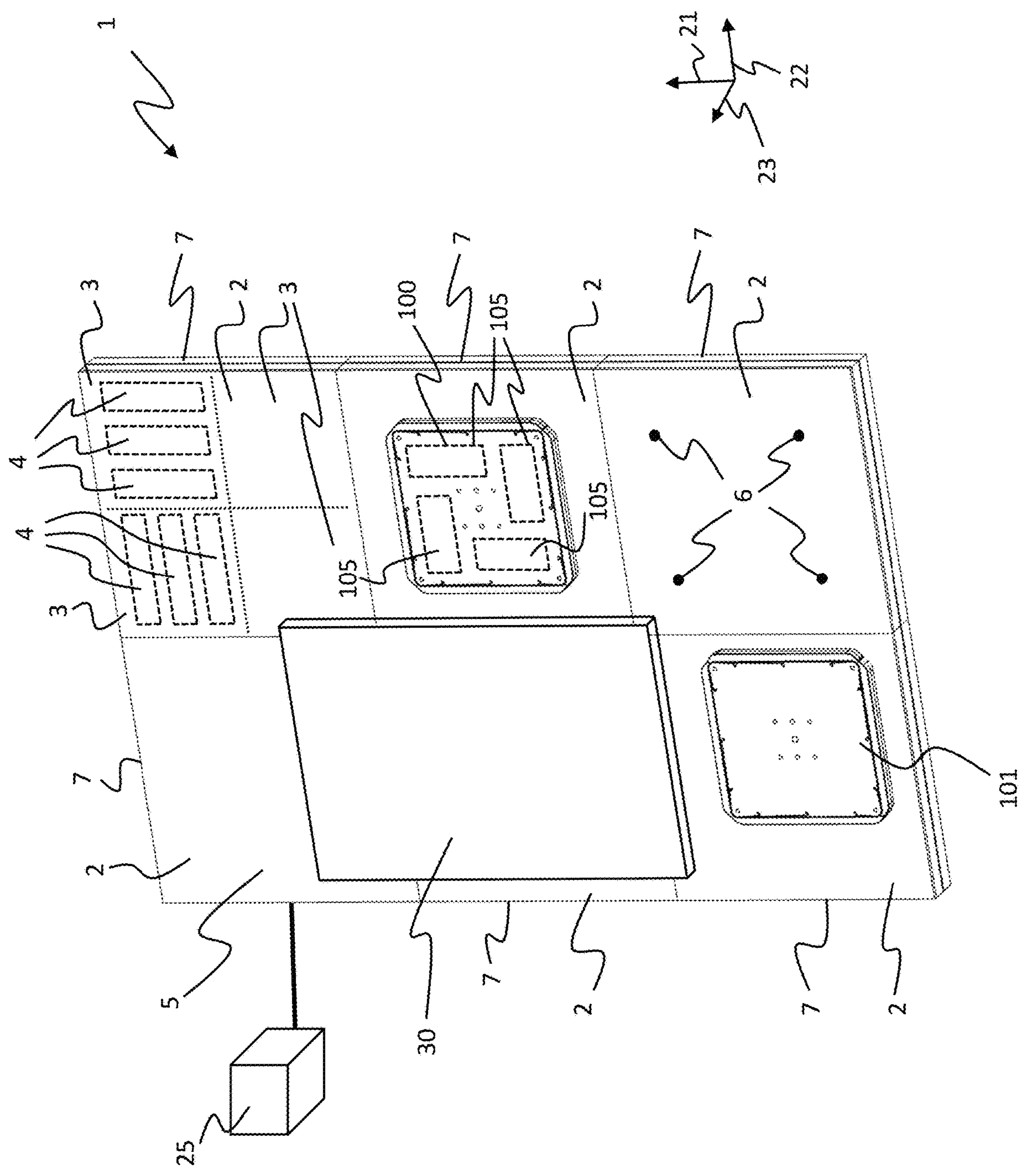
FIG. 1 shows a planar drive system.

The figures are merely schematic and not to scale. Furthermore, the reference numerals in the figures are chosen unchanged if they are elements or components of the same embodiment.

In the following, the same reference numerals may be used for the same features.

Furthermore, for reasons of clarity, it may be provided that not all elements are shown in each figure. Furthermore, for the sake of clarity, it may be provided that not every element is indicated by its own reference numeral in every drawing.

FIG. 1 shows a planar drive system 1 having six stator modules 2, where the stator modules 2 are arranged in such a way that a rectangle is formed by two on three stator modules 2. Other arrangements of the stator modules 2 are also conceivable, and more or fewer than six stator modules 2 may be arranged. In the stator module 2 shown above on the right, an interior of the stator module 2 is sketched, wherein the stator module 2 comprises four stator assemblies 3, the four stator assemblies 3 being arranged within a stator module 2 in a square two-on-two arrangement. Furthermore, for two stator assemblies 3, it is shown that the stator assemblies 3 comprise coil arrangements 4, the coil arrangements 4 being shown with different orientations. The coil arrangements 4 are used to generate a stator magnetic field.

In the embodiment shown, the coil arrangements 4 are rectangular and elongated coil arrangements 4. In each stator assembly 3 of the stator modules 2, three individual rectangular and elongated coils of a coil arrangement 4 are shown. Likewise, in an embodiment, a different number of individual rectangular and elongated coils could form a coil arrangement 4. In this case, their longitudinal extension is oriented parallel to one of the edges of the respective stator assembly 3.

Below each of the depicted coil arrangements 4, further coils are present which have an orientation rotated by 90° with respect to their longitudinal extension. This grid of longitudinally extended and rectangular coils of a coil arrangement 4 may be embodied one on top of the other for a plurality of times. In real terms, neither stator assemblies 3 nor coil arrangements 4 are visible, since they are surrounded by a housing 7 of the stator module 2. The six stator modules 2 form a continuous stator surface 5 above the stator assemblies 3. Furthermore, a rotor 100 is arranged, the rotor having a plurality of magnet units 105 for generating a rotor magnetic field. The coil arrangements 4 may interact with the magnetic units 105 when an appropriate current is applied, thereby moving the rotor 100 within the planar drive system 1 above the stator surface 5. A plane of motion for the rotor 100 is thus defined by the stator surface 5.

The depiction in FIG. 1 is simplified as each stator assembly 3 has a plurality of coil arrangements 4 arranged therein, each coil arrangement 4 being at 90° to one another, but only one layer of coil arrangements 4 is shown at any one time. The magnet units 105 are arranged circumferentially within the rotor 100 and may interact with the coil arrangements 4, respectively, to move the rotor 100.

FIG. 1 further shows a further rotor 101 in which there are integrated magnet units 105. The movements of the rotor 100 may in particular take place in a plane spanned by a first direction 21 and a second direction 22. Furthermore, a superposition of these movements is possible, so that the rotor 100 may be moved in all directions parallel to the stator surface 5. Furthermore, the rotor 100 may be moved in a third direction 23 perpendicular to the stator surface 5.

The arrangement of four stator assemblies 3 within a stator module 2 corresponds to the stator modules 2 for a planar drive system 1 sold by the applicant under the name XPlanar, available from Beckhoff Automation GmbH of Verl, Germany and Savage, Minnesota U.S.A. Alternatively, it may be provided to arrange more or fewer stator assemblies 3 within a stator module 2. For example, each stator module 2 may comprise only one stator assembly 3 or may comprise more than four stator assemblies 3.

Also shown in FIG. 1 is a planar object 30 arranged on the stator surface 5. The rotor 100 is arranged adjacent to the planar object 30 in FIG. 1. A tool, which is arranged at the rotor 100, may serve for processing the planar object. Due to the fact that the rotor 100 with the tool may be moved freely over the stator surface 5, a flexible processing of the planar object 30 is possible, in which, for example, a plurality of rotors 100 with different tools may be used. The rotors 100 may be controlled individually and may thus move independently of one another, so that flexible processing sequences are possible.

Furthermore, an additional cover made of a non-magnetic material may be used to cover the stator modules 2. The cover may e.g. be used to protect the stator modules 2 or the stator surface 5 from damage during processing processes. The cover may e.g. be up to one millimeter in thickness.

Also shown in FIG. 1 is a controller 25 that is connected to one of the stator modules 2. It may be provided in this context that the stator modules 2 may pass on communication signals to one another. As an alternative, each stator module 2 may also be connected to the controller 25. The controller 25 is configured to output signals to the stator modules 2, the stator modules 2 being configured to energize the coil arrangements 4 on the basis of the signals and as a result to control a movement of the rotor 100 parallel to the stator surface 5. The coil arrangements 3 may further be energized based on the signals in such a way that the rotor 100 is moved perpendicularly to the stator surface 5. Furthermore, the coil arrangements 3 may be energized based on the signals in such a way that the rotor 100 is rotated about an axis perpendicular to the stator surface 5, or rotated at least a few degrees, or rotated a few degrees about an axis parallel to the stator surface 5

In order to process the planar object 30, the following steps are provided:

a. energizing the coil groups 4 in such a way that the rotor 100 has a predetermined height above the stator surface 5 in the third direction 23.

b. energizing the coil groups 4 in such a way that the rotor 100 moves along a predetermined trajectory, with the tool and the planar object 30 being in mechanical contact and thereby processing the planar object.

The controller 25 is in this context set up to output a first signal, with the coil groups 4 being energized on the basis of the first signal in such a way that the rotor 100 has a predetermined height above the stator surface 5 in the third direction 23, and also to output a second signal, with the coil groups 4 being energized on the basis of the second signal in such a way that the rotor 100 moves along a predetermined trajectory, with the tool and a planar object 30 being in mechanical contact and the planar object 30 being processed as a result. In this regard, the planar object 30 may be arranged between the rotor 100 and the stator surface 5. This may e.g. include the rotor 100 at least partially covering the planar object 30.

The planar object 30 may in particular comprise an object which has significantly smaller dimensions in the third direction 23 than in the first direction 21 and/or the second direction 22. The planar object 30 may e.g. be paper, cardboard, a layer of plastic or a metal sheet. In the latter case, it may particularly be provided that the metal sheet is not ferromagnetic so as not to excessively disturb the interaction of the stator magnetic field with the rotor magnetic field. By arranging the planar object 30 between the rotor 100 and the stator surface 5, a force of the tool on the planar object may be well controlled, since this force may be well adjusted and/or controlled and/or regulated with the aid of energizing the coil groups 4 and the resulting attraction between the coil groups 4 and the magnetic units 105. Thus, a simple processing method for planar objects 30 is provided.

Also shown in FIG. 1 are magnetic field sensors 6 in one of the stator modules 2, wherein each of the stator modules 2 may comprise magnetic field sensors 6. In an embodiment of the method, a thickness of the planar object 30 is determined. The thickness may comprise a dimension of the planar object 30 in the third direction 23. The predetermined height is calculated using the thickness. For this purpose, for example, the magnetic field sensors 6 arranged within the planar drive system 1, which may additionally serve to determine a position of the rotor 100, may be used.

In an embodiment of the method, when the coil groups 4 are energized in such a way that the rotor 100 has a predetermined height above the stator surface 5 in the third direction 23, a magnetic permeability of the planar object 30 is taken into account. The magnetic permeability may either be predetermined on the basis of knowledge of the material, the thickness and/or other properties of the planar object 30 or may be determined with the aid of a sensor, for example with the aid of the magnetic field sensors 6.

In an embodiment of the method, a current intensity of the coil groups 4 is adapted, in particular increased, on the basis of the magnetic permeability of the planar object 30. By increasing the current intensity, an influence on the interaction of the stator magnetic field with the rotor magnetic field triggered by the magnetic permeability may be compensated at least partially, preferably completely.

In an embodiment, more than one rotor 100 is provided, each such rotor 100 comprising a tool. This allows for easy replacement of the tools.

Figure 2:
FIG. 2 depicts a side view of a planar drive system.
Figure 2:
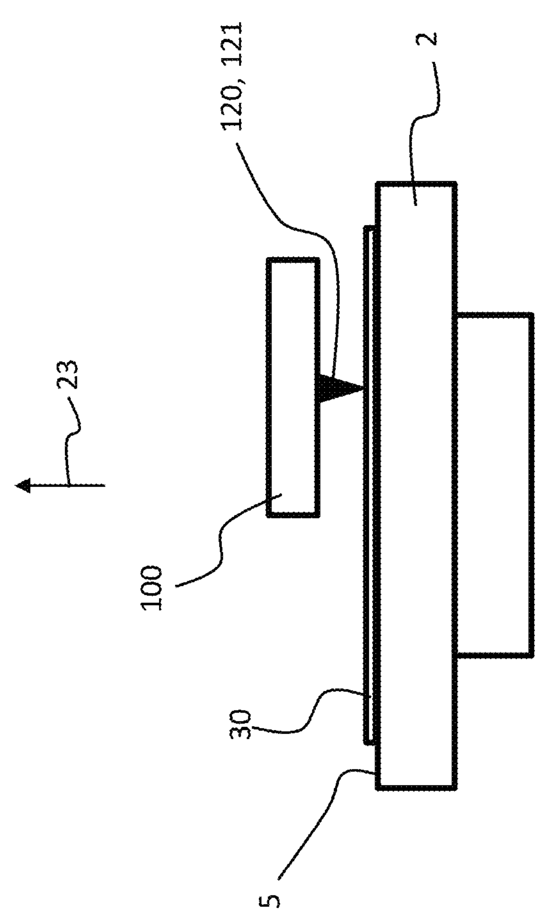

FIG. 2 shows a side view of a planar drive system 1 with the aid of which a planar object 30 may be processed. In contrast to FIG. 1, only one stator module 2 is shown, but further stator modules 2 analogous to FIG. 1 may be provided, as well. Furthermore, the stator module 2 may have stator assemblies 3, coil groups 4 and magnetic field sensors 6, as described in connection with FIG. 1. The planar object 30 is arranged between the stator surface 5 and the rotor 100. The rotor 100 comprises a tool 120, which is embodied as a cutting tool 121 and is arranged centrally at the rotor 100. The cutting tool 121 serves to cut the planar object 30. For this purpose, the cutting tool 121 is in mechanical contact with the planar object 30. The cutting tool 121 may also be arranged at other positions of the rotor 100.

In this context, a working space of the cutting tool 121 may encompass the entire stator surface 5 and is thus only limited by the size and arrangement of the stator modules. Furthermore, a power consumption of the coil modules 4 may be measured and a change in the power consumption may be used to detect that the cutting tool 121 is or is becoming blunt. In this case, the rotor 100 with the cutting tool 121 may be moved away from the planar object 30 in the third direction 23 and replaced by another rotor with a sharp cutting tool. Furthermore, it may be provided that a plurality of rotors 100 having a plurality of cutting tools 121 are used, each of which processes the planar object 30 at different locations. Since the rotors 100 may be controlled individually, the result is a flexible processing option.

In an embodiment, the coil groups 4 are first energized in such a way that the rotor 100 moves in the third direction 23 away from the stator surface 5. Subsequently, the coil groups 4 are energized in such a way that the rotor 100 is located above the planar object 30. Subsequently, the coil groups 4 are energized in such a way that the rotor 100 moves in the third direction 23 towards the stator surface 5 until the tool 120, i.e. the cutting tool 121, and the planar object 30 are in mechanical contact.

Although this method was explained in more detail in connection with FIG. 2, it may also be applied to the other embodiments comprising alternative tools. In particular, the magnetic field sensors 6 may be evaluated to determine the mechanical contact of the tool 120 with the planar object 30, for example, when the rotor 100 cannot be moved further toward the stator surface 5 because the tool 120 is already in contact with the planar object 30. If necessary, a processing depth may further be used in setting the predetermined height, for example, a required depth of cut in the embodiment example of FIG. 2. It may further be provided that the rotor 100 may be rotated 360 degrees with the cutting tool 121. This may be used for drilling holes. In particular, it may be provided to use a rotor 100 with a cutting tool 121 both for straight cuts and for drilling holes. This allows for more flexible processing.

Figure 3:
FIG. 3 depicts a side view of a planar drive system.
Figure 3:
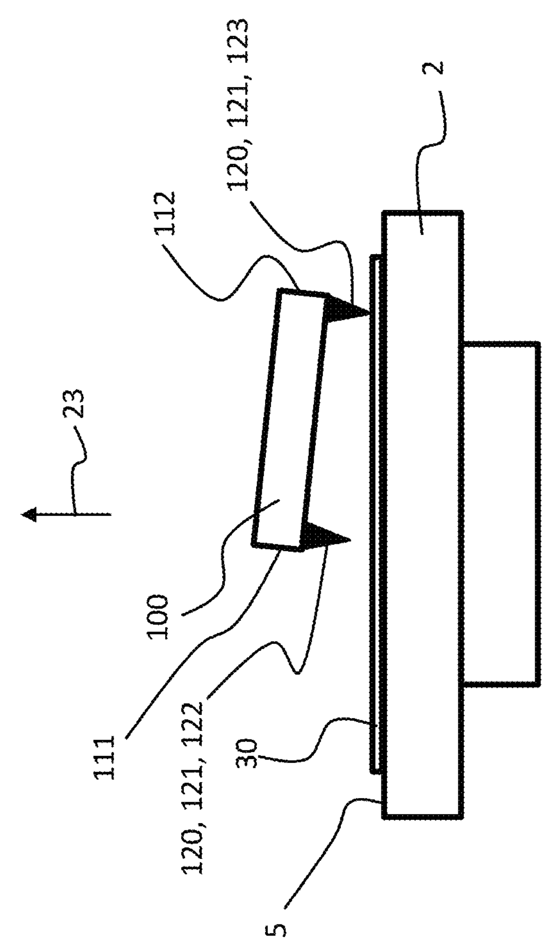

FIG. 3 shows a side view of a planar drive system 1 corresponding to the planar drive system 1 of FIG. 2, unless differences are described below. The cutting tool 121 comprises a first cutting edge 122 and a second cutting edge 123, the first cutting edge 122 being arranged on a first side 111 of the rotor 100 and the second cutting edge 123 being arranged on a second side 112 of the rotor 100. The first side 111 and the second side 112 of the rotor 100 are opposite to each other. For processing the planar object 30, the rotor 100 is set at an angle in such a way that either the first cutting edge 122 or the second cutting edge 123 is in mechanical contact with the planar object 30.

FIG. 3 shows the case in which the second cutting edge 123 is in mechanical contact with the planar object 30 and the first cutting edge 122 is not in mechanical contact. The rotor 100 is set at an angle, i.e. not parallel to the stator surface 5. Thus, it is possible to select between the first cutting edge 122 and the second cutting edge 123, thus allowing for more flexible processing, especially when the first cutting edge 122 and the second cutting edge 123 are different. In this regard, it may further be provided that the first cutting edge 122 and the second cutting edge 123 are suitable for processing different materials, that is, in particular the first cutting edge 122 is suitable for a first material and the second cutting edge 123 is suitable for a second material. In an alternative embodiment, the first cutting edge 122 and the second cutting edge 123 may also be in mechanical contact with the planar object 30 at the same time and jointly process the planar object 30. Similarly, more than two cutting tools 121 may be arranged on a rotor 100. Furthermore, by moving the rotor 100 with the cutting tool 121 along a circular path, circles may be cut.

Figure 4:
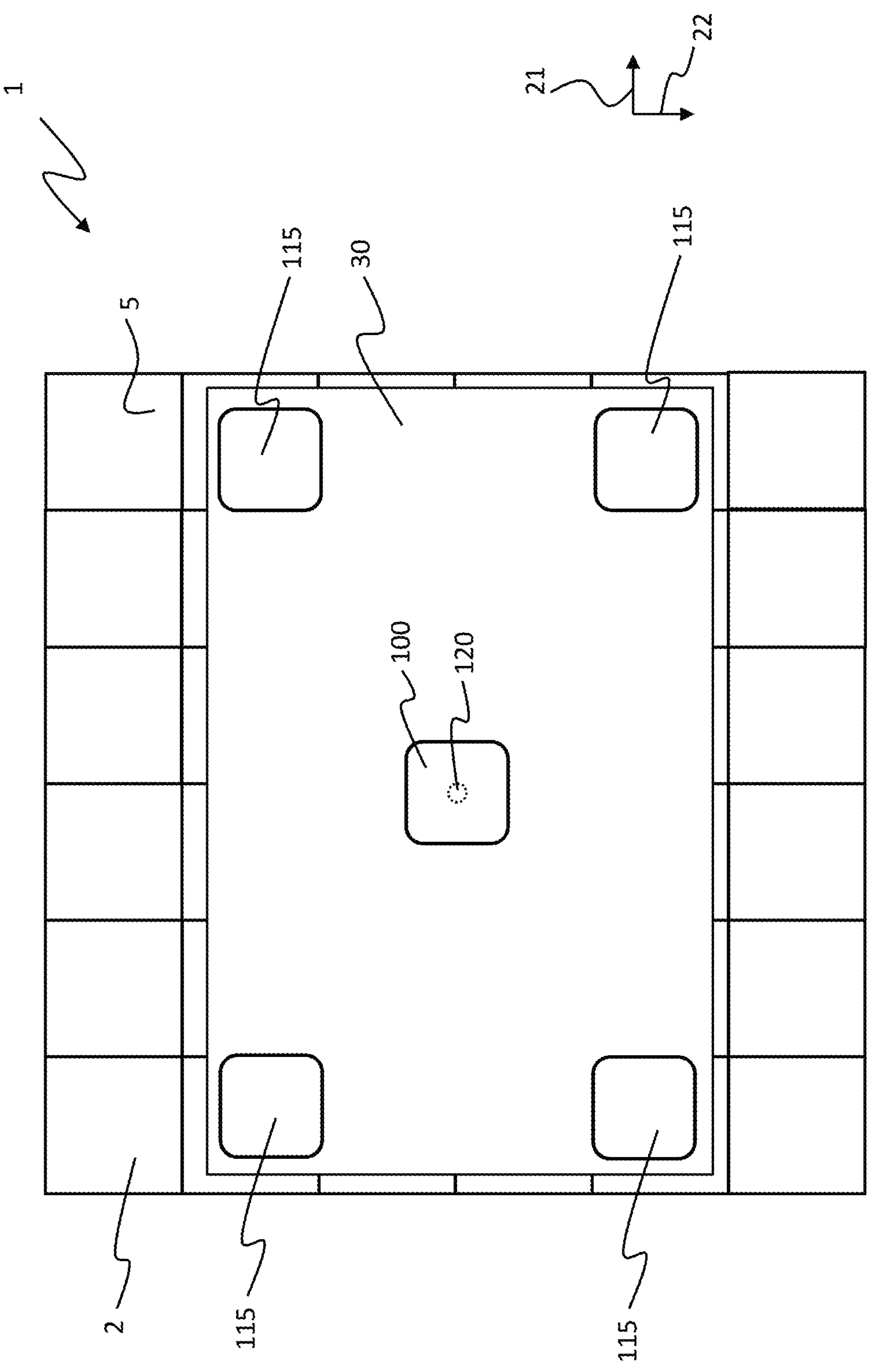
FIG. 4 depicts a top view of a planar drive system.

FIG. 4 shows a top view of a planar drive system 1 which may have the features described in connection with FIGS. 1 to 3. The planar drive system 1 further comprises four fixation rotors 115, the number of fixation rotors 115 being at least one. With the aid of the coil groups 4, the fixation rotors 115 are moved towards the stator surface 5 in such a way that the planar object 30 at the stator surface 5 is restricted from moving in the first direction 21 and/or second direction 22 and/or third direction 23 with the aid of the fixation rotor 115. Thus, the rotor 100 with the tool 120 may be more easily used to process the planar object 30 since the planar object 30 is more snug against the stator surface 5 and is less likely to move due to an application of force by the tool 120.

Figure 5:
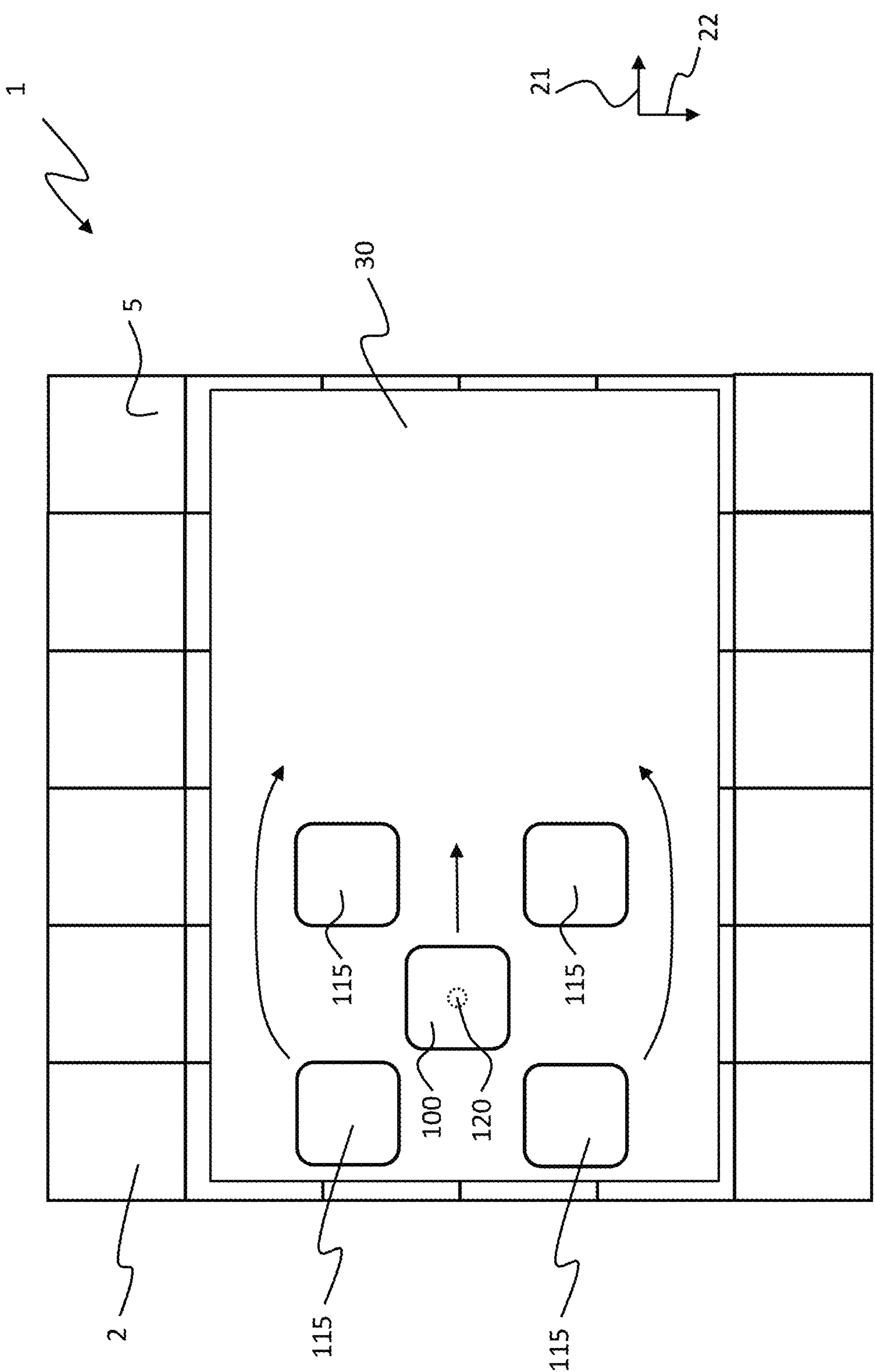
FIG. 5 shows a top view of a planar drive system.
Figure 6:
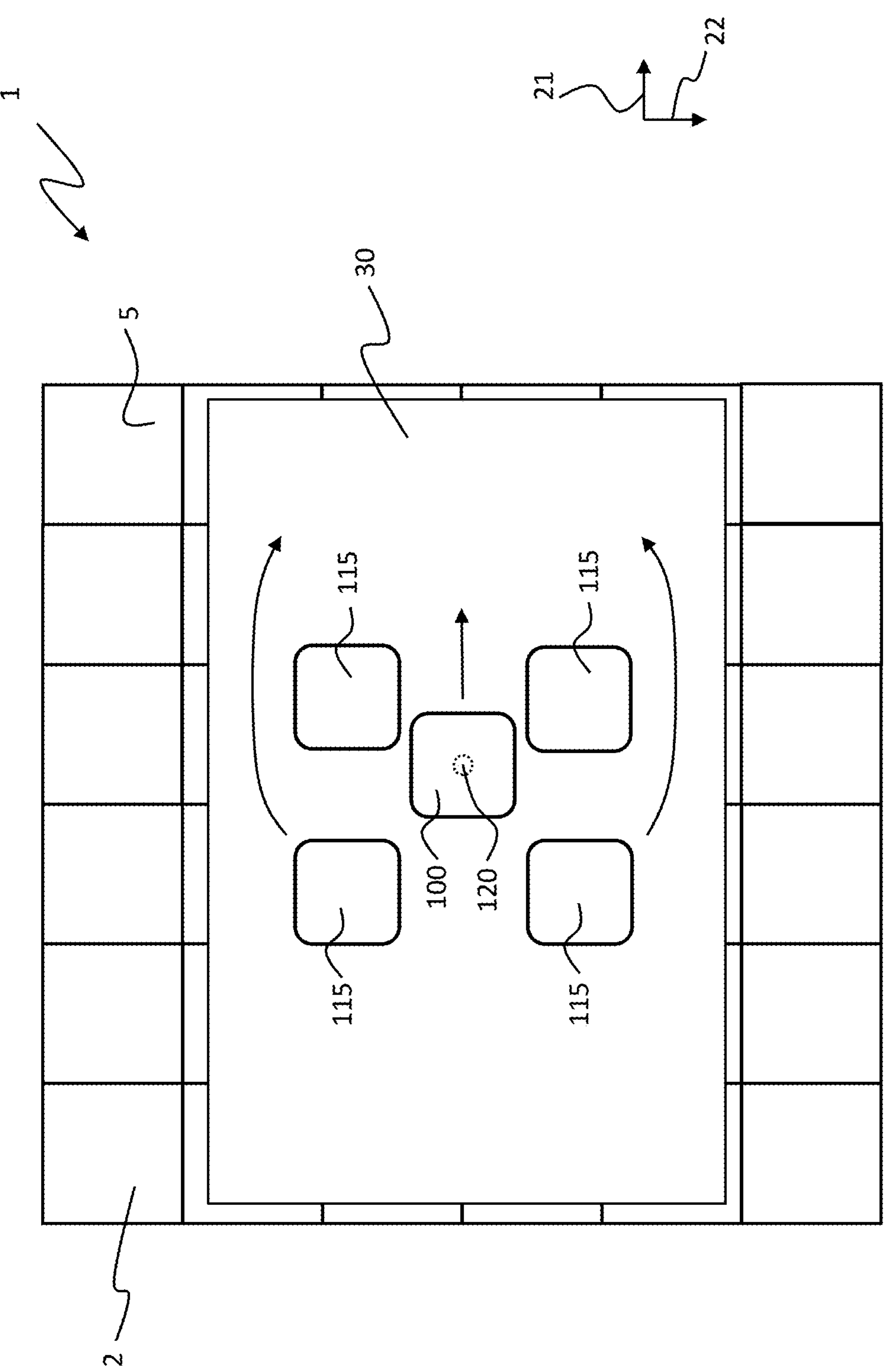
FIG. 6 shows a top view of a planar drive system.

FIG. 5 and FIG. 6 show a top view of a planar drive system 1, which is constructed like the planar drive system of FIG. 4. During operation, i.e. during processing of the planar object 30 with the aid of the rotor 100 comprising the tool 120, individual ones of the fixation rotors 115 may be moved so that a fixation of the planar object 30 always takes place in the vicinity of the rotor 100 comprising the tool 120 and thus the planar object 30 is even less likely to move due to an application of force by the tool 120. In this regard, the fixation rotor 115 may optionally include a tool such as one or more rollers.

As indicated with the aid of arrows, fixation rotors 115 that are no longer needed to fix the planar object 30 may be moved past other fixation rotors 115 that are currently needed to fix the planar object 30, so as to fixate the planar object 30 again before the rotor 100 comprising the tool 120 reaches a next processing area. Thus, continuous processing of the planar object 30 is possible, requiring only a small number of fixation rotors 115. Furthermore, the planar object 30 may occupy the entire stator surface 5, so that a size of the planar object 30 is limited only by the stator surface 5, which may be increased as desired with the aid of the number of stator modules 2.

Figure 7:
FIG. 7 depicts a side view of a planar drive system.
Figure 7:
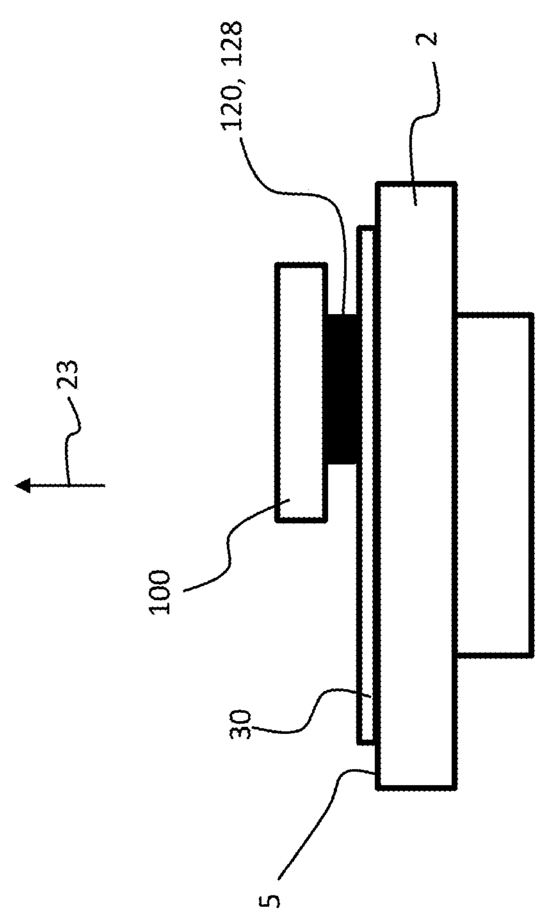

FIG. 7 shows a side view of a planar drive system 1 corresponding to the planar drive system 1 of FIG. 2, unless differences are described below. Instead of the cutting tool 121, the tool 120 comprises a punching tool 128 arranged at the rotor 100. The processing of the planar object 30 comprises punching. The planar object 30 may comprise a food product such as a slice of cheese or sausage. However, other materials may also be punched, in particular the materials already mentioned. It may be provided that the punching tool 128 comprises a device for ejecting a punched-out material. Alternatively, it may be provided that the removal of the punched-out material from the punching tool 128 is effected in such a way that the coil groups 4 are energized such that the rotor 100 moves back and forth, the movement causing the punched-out material to be shaken out.

For example, reciprocating motion may occur at a frequency between one-tenth of a hertz and ten hertz. The ejection may thereby take place, for example, at a predetermined position of the stator surface 5, wherein, as the case may be, the punched-out material may be removed from the stator surface 5. It is likewise possible to check a punching quality with the aid of the magnetic field sensors 6. This is done in particular by checking whether the rotor 100, after it has been moved towards the planar object 30 and the punching tool 128 has acted upon the planar object 30, is parallel to the stator surface 5. If this is the case, complete punching may be assumed. If this is not the case, the planar object 30 was not completely pierced by the punching tool 30.

Different rotors 100 may in this context comprise different punching tools 128, i.e. punching tools 128 having different shapes. The positions at which the punching operations take place may be selected dynamically, for example in order to obtain as many punched parts (punched-out material) as possible from a material sheet of the planar object 30. In this regard, it may be provided that an ideal punching arrangement of the punching tools 128 is calculated in advance by the controller 10.

Figure 8:
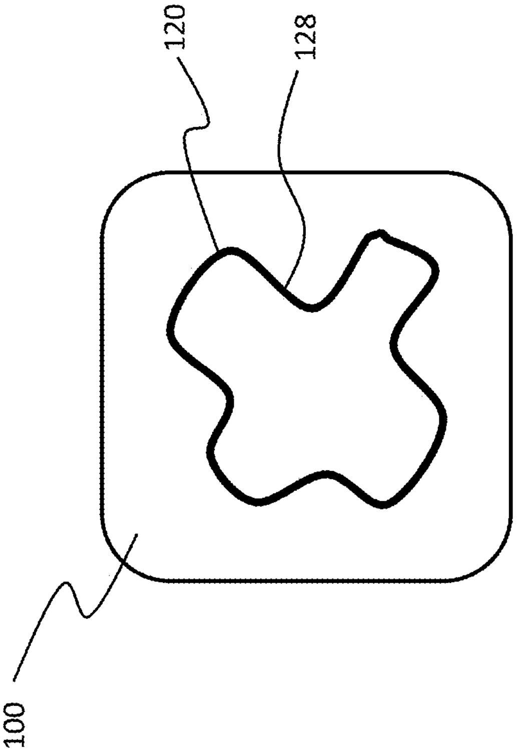
FIG. 8 shows a view of a rotor.

FIG. 8 shows a top view from below of the rotor 100 with the punching tool 128 of FIG. 7. The punching tool 128 may have any shape. Furthermore, multiple rotors 100 may be coupled and the punching tool 128 may be arranged over multiple rotors 100.

Figure 9:
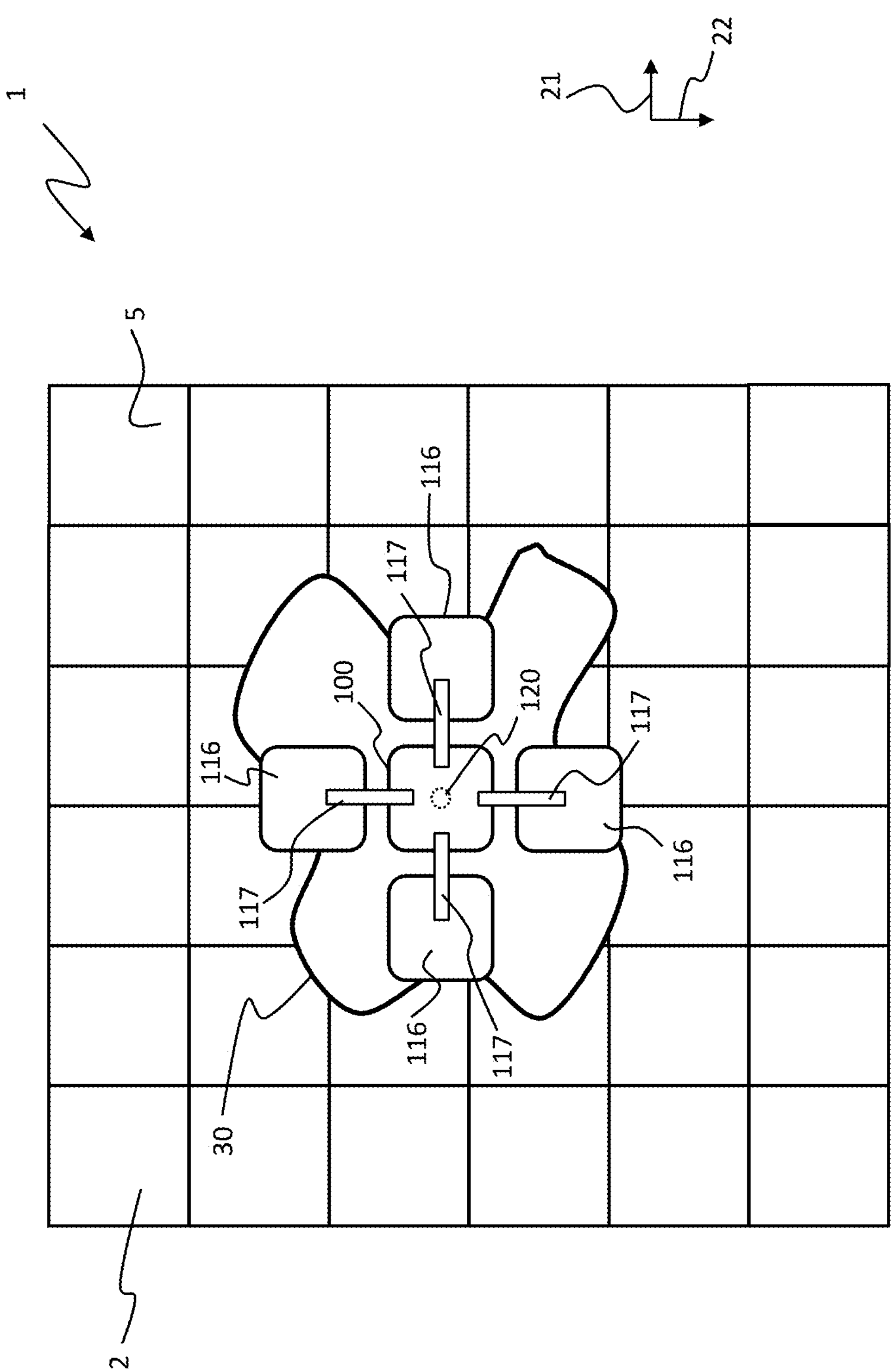
FIG. 9 is a top view of a planar drive system.

FIG. 9 shows a top view of a planar drive system 1 with the aid of which a planar object 30 may be processed, and in which four force-increasing rotors 116 act upon the rotor 100 with the aid of force transmission units 117 in order to increase a force of the tool 120 onto the planar object 30 in the third direction 23. In particular, a different number of force-increasing rotors 116 may be selected, as well, for example a force-increasing rotor 116. The force-increasing rotors 116 may be used in a flexible manner and may act upon different rotors 100 having the tool 120.

This may be particularly advantageous when different rotors 100 are to be used with different tools 120. In particular, the tool 120 may comprise the cutting tool 121 described above or the punching tool 128 described above. A maximum force with the aid of which the tool 120 may act upon the planar object 30 is limited by the magnetic attraction between the coil arrangements 4 of the stator modules 2 and the magnetic units 105 of the rotors 100. The force-increasing rotors 116 allow for an additional force to act upon the rotor 100 comprising the tool 120, which is generated by a magnetic attraction between the coil arrangements 4 of the stator modules 2 and the magnetic units 105 of the force-increasing rotors 116.

Figure 10:
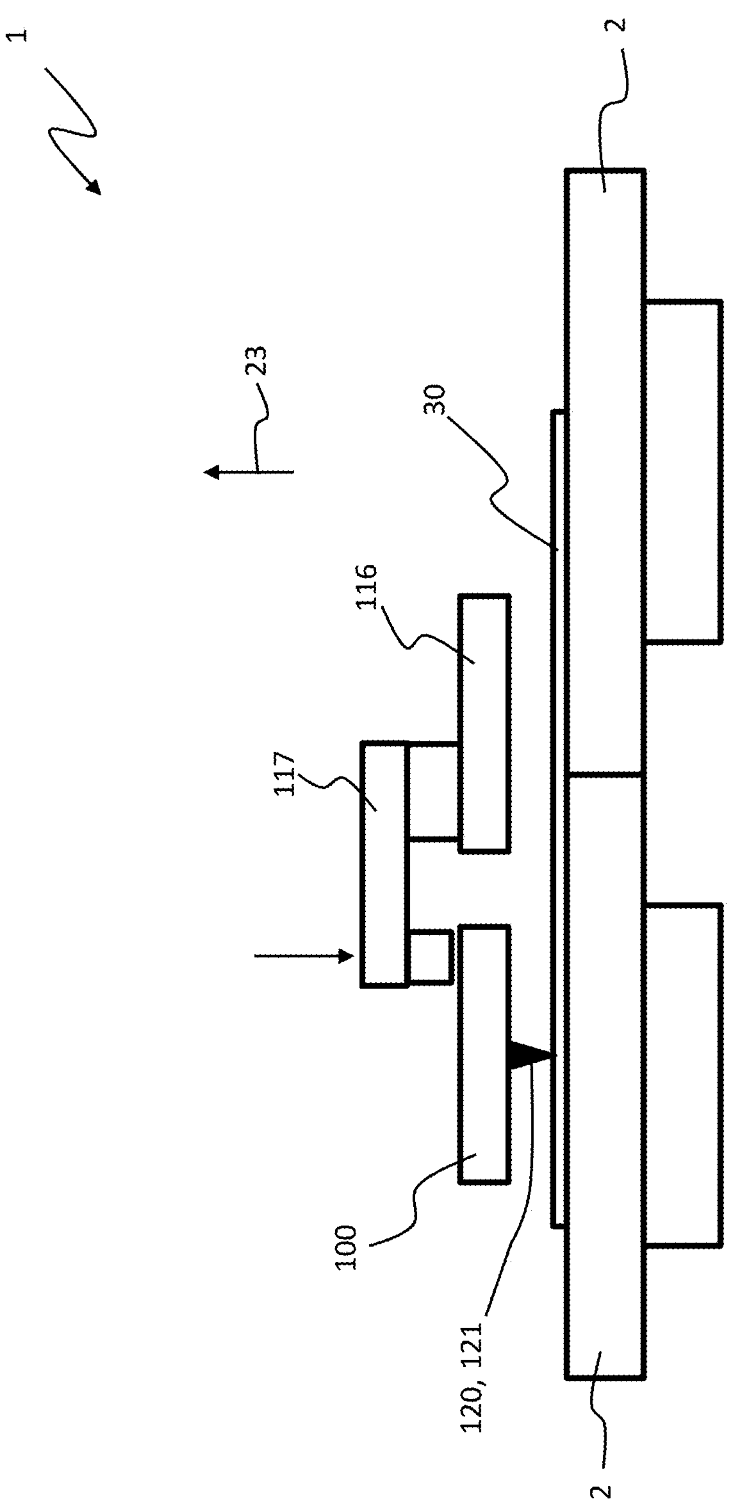
FIG. 10 depicts a side view of a planar drive system.

FIG. 10 shows a side view of a planar drive system 1 having a rotor 100 comprising a tool 120, in this case a cutting tool 121, and a force-increasing rotor 116 with a force-transmitting unit 117. The force of the tool 120 on the planar object 30 may thus be increased in the third direction 23. It may further be provided that, when force-increasing rotors 116 are used as described in connection with FIGS. 9 and 10, a number of the force-increasing rotors 116 is selected based on a thickness of the planar object 30 to be processed, and in particular, more force-increasing rotors 116 are used for thicker planar objects 30.

Figure 11:
FIG. 11 is a side view of a planar drive system.
Figure 11:
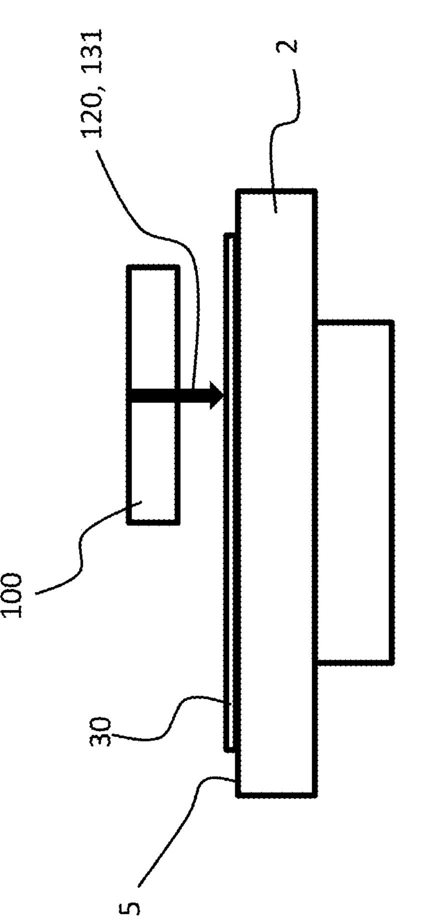

FIG. 11 shows a side view of a planar drive system 1 with the aid of which a planar object 30 may be processed. The rotor 100 comprises a pen 131 as a tool 120. Processing the planar object 30 includes writing or drawing. In particular, if the pen 131 is a pencil, a wear of a pencil lead may be detected, e.g. via the force acting upon the rotor 100, determined by the magnetic field sensors 6. Then, a flight height of the rotor 100 in the third direction 23 may be adjusted so that, for example, in spite of a worn pen 131, a contact pressure of the pen 131 on the planar object remains identical, or the pencil 131 continues to contact the planar object 30. As an alternative, it may also be provided to replace the pen 131 and to remove the rotor 100 from the planar object 30 for this purpose.

Figure 12:
FIG. 12 shows a top view of a planar drive system.
Figure 12:
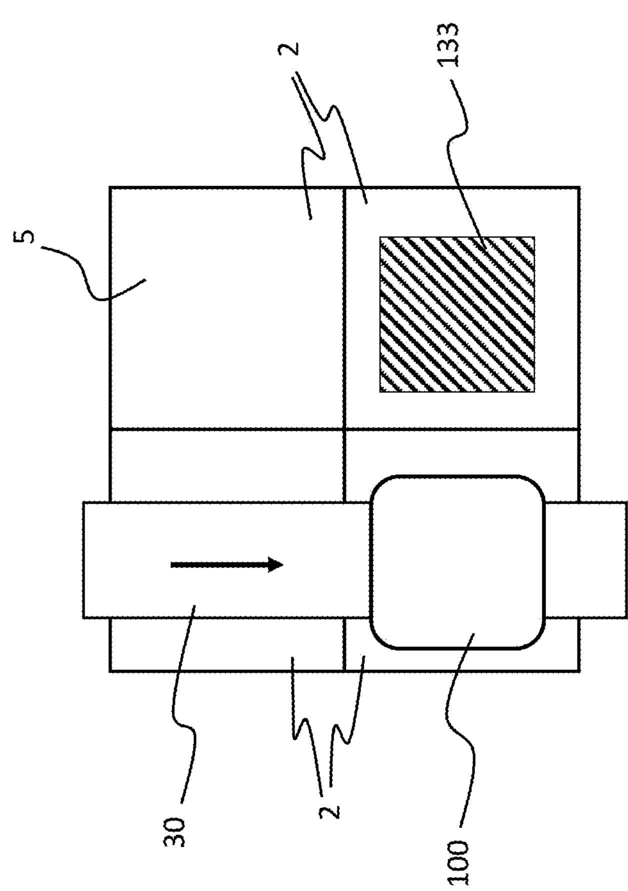

FIG. 12 shows a top view of a planar drive system 1 in which the rotor 100 comprises a stamp and with the aid of which a planar object 30 may be processed. A stamp bed 133 is arranged on the stator surface 5, wherein the stamp of the rotor 100 picks up new stamp ink from the stamp bed 133 at regular intervals.

Figure 13:
FIG. 13 shows a side view of a planar drive system.
Figure 13:
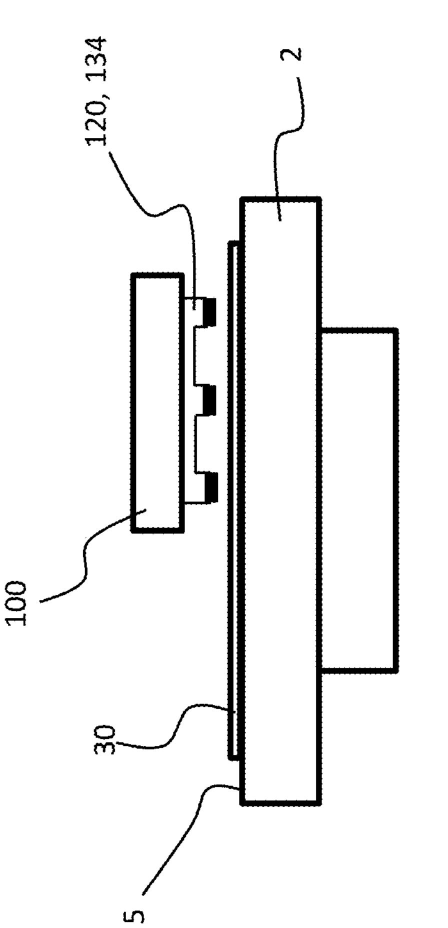

FIG. 13 shows a side view of the planar drive system 1 of FIG. 12. The tool 120, in this case the punch 134, is again arranged between the rotor 100 and the planar object 30. The planar object 30 of FIGS. 12 and 13 may comprise a continuous material, for example paper or a film. It may be particularly advantageous in this context if the passing material of the planar object and the rotor 100 move synchronously with the stamp 134, i.e. at a speed that is coordinated with one another. This allows the stamp 134 to transfer ink from the stamp bed 133 to the planar object 30 without having to stop the planar object 30. This allows for a more efficient process, as the coil groups 4 may be energized in such a way that the rotor 100 moves in synch with the planar object.

If the ink present in the stamp bed 133 is partially used up, it may be provided that the rotor 100 with the stamp 134 is pressed onto the stamp bed 133 with a greater force and thus just as much ink is transferred to the stamp 134 as with more ink in the stamp bed 133 and less force applied. The force with the aid of which the stamp 134 is pressed onto the stamp bed 133 may thus be adapted to the amount of ink present in the stamp bed 133. Furthermore, as an alternative, it may be provided that if less ink is present on the stamp 134, for example due to less ink in the stamp bed 133 or because a stamp impression has already been transferred, the stamp 134 is pressed onto the planar object 30 with a greater force.

In analogy to FIG. 3, a plurality of punches 134 may also be provided at the rotor 100. In this case, the punch to be used may be selected by tilting the rotor 100 accordingly, as described in connection with FIG. 3.

Figure 14:
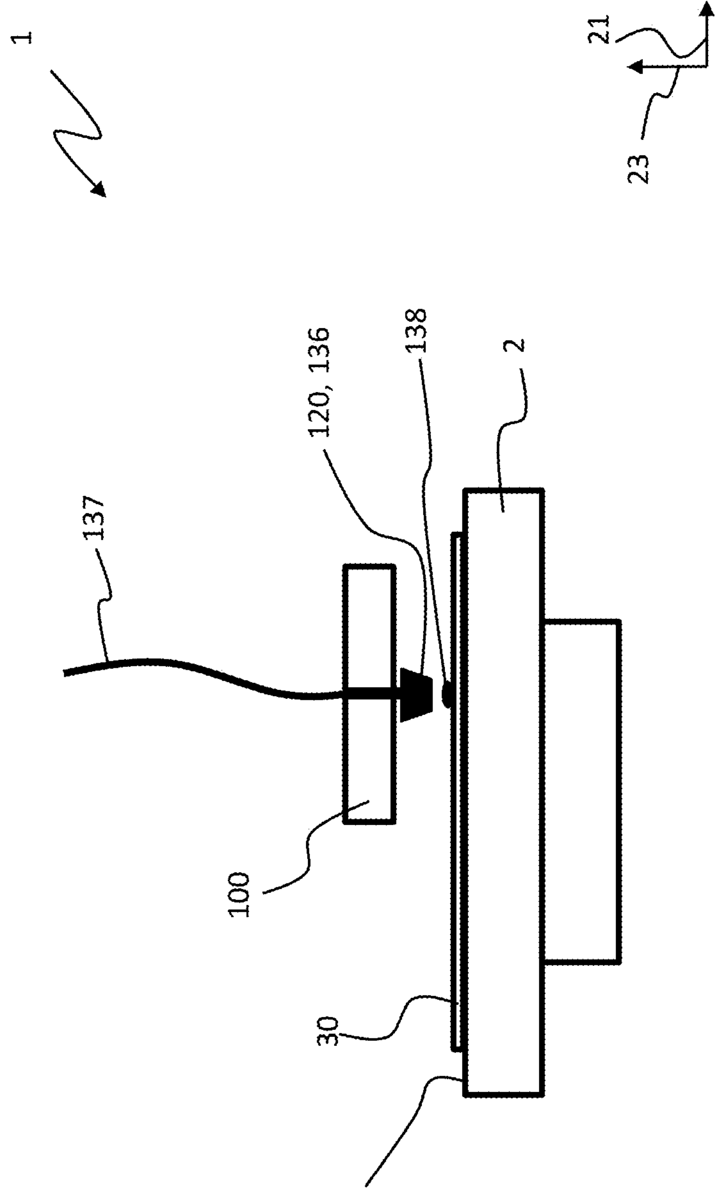
FIG. 14 is a side view of a planar drive system.

FIG. 14 shows a side view of a planar drive system 1 that may be used to process a planar object 30. The tool 120 comprises an adhesive-dispensing nozzle 136. The processing of the planar object 30 comprises an application of an adhesive 138. Furthermore, the adhesive-dispensing nozzle 136 is connected to an adhesive supply 137, with the aid of which the adhesive 138 may be provided. By tilting or inclining the rotor 100, difficult-to-reach areas of the planar object 30 may thereby be wetted with adhesive 138. The adhesive 138 is transferred with the aid of mechanical contact between the tool 120 and the planar object 30, with the adhesive 138 establishing the mechanical contact.

Figure 15:
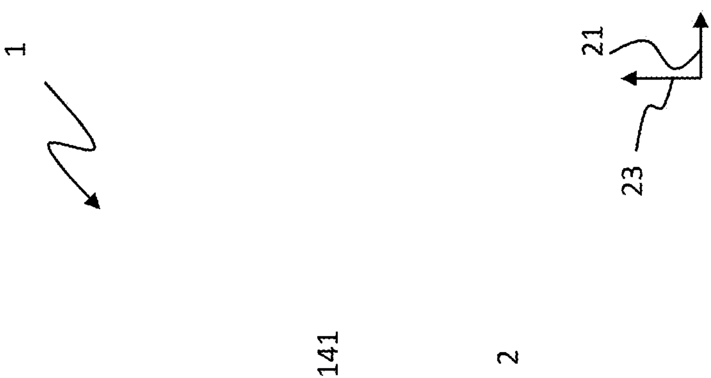
FIG. 15 is a side view of a planar drive system.
Figure 15:
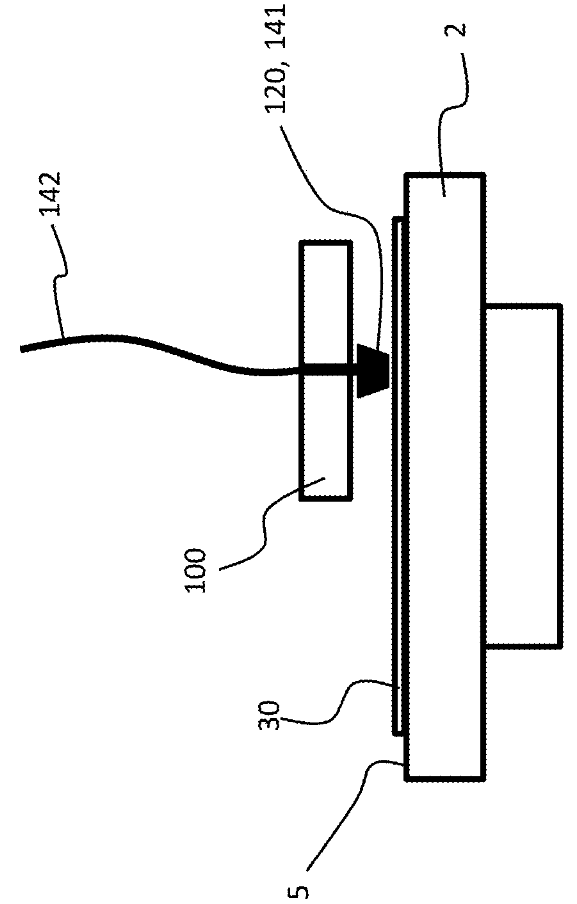

FIG. 15 shows a side view of a planar drive system 1 that may be used to process a planar object 30. The tool 120 comprises a print head 141. The processing of the planar object 30 comprises printing. Furthermore, the print head 141 is connected to a printing material supply 142, which may be used to provide printing material. The printing material may be ink, pigments, but also 3D printing material. The printing material is transferred with the aid of mechanical contact between the tool 120 and the planar object 30, with the printing material providing the mechanical contact.

Figure 16:
FIG. 16 is a side view of a planar drive system.
Figure 16:
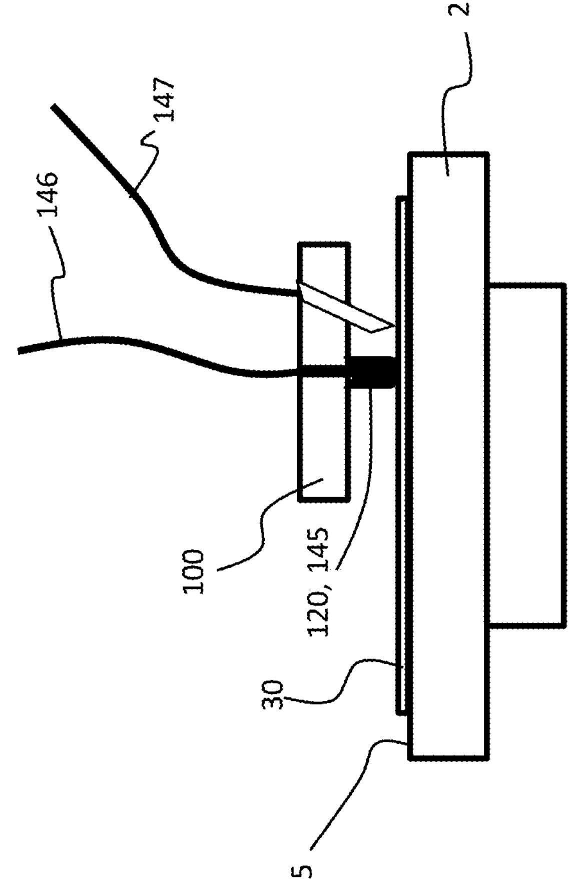

FIG. 16 shows a side view of a planar drive system 1 that may be used to process a planar object 30. The tool 120 comprises a driven tool 145 and the processing of the planar object 30 comprises drilling and/or milling and/or engraving and/or sawing and/or grinding and/or perforating. In particular, the driven tool 145 may comprise a pneumatic drive and/or a hydraulic drive and or an electric drive. In the case of the electric drive, the driven tool 145 may be referred to as an electric tool. The driven tool 145 may comprise a fast-turning multi-functional tool. In this regard, fast rotating may mean that the multi-functional tool may have a rotational speed of more than five hundred revolutions per minute. Such a multi-functional tool may include a tool head having cutting edges that may be used to carry out a processing operation on the planar object 30.

Furthermore, a power cable is provided for powering the power tool 145, and a suction 147 is provided for extracting chippings or dust. It may be provided that, contrary to the illustration in FIG. 16, the suction 147 is arranged on a further rotor 100.

Figure 17:
FIG. 17 shows a side view of a planar drive system.
Figure 17:
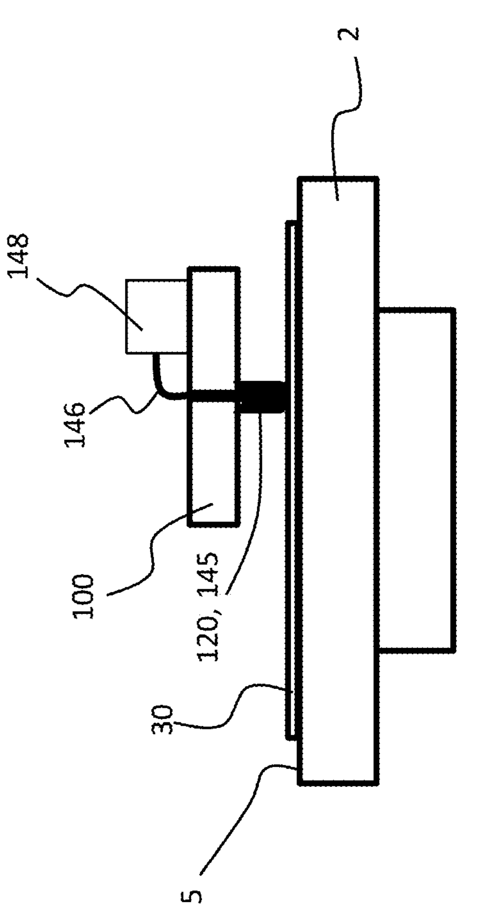

FIG. 17 shows a side view of a planar drive system 1 corresponding to the planar drive system 1 of FIG. 16, unless differences are described below. No suction is provided. Instead, the rotor 100 has an accumulator 148 which is connected to the driven tool 145 with the aid of the power cable 146. Thus, an electrical supply to the driven tool 145 may be achieved.

In FIGS. 16 and 17, the driven tool 145 is arranged centrally at the rotor. Of course, the driven tool 145 may also be arranged at another position, for example at the edge.

In the embodiments of FIGS. 11 to 17, the fixation rotors 115 described in connection with FIGS. 4 to 6 and/or the force-increasing rotors 116 described in connection with FIGS. 9 and 10 may be used, as well.

Figure 18:
FIG. 18 depicts a side view of a planar drive system.
Figure 18:
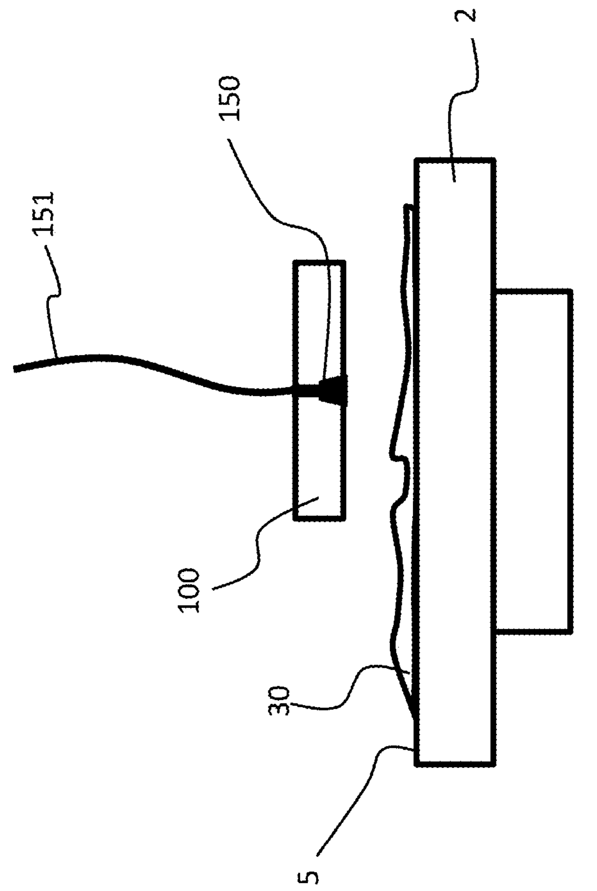

FIG. 18 shows a side view of a planar drive system 1. A camera 150 comprising a data and power transmission 151 is arranged at the rotor 100, wherein the data and power transmission 151 is shown as wired, i.e. as a cable, but may also be a wireless connection. Furthermore, the power transmission may be cable-connected and the data transmission may be wireless. With the aid of the camera 150, a quality check may be carried out. Furthermore, with the aid of the camera 150, a 2S code, e.g. a QR code, applied to the planar object 30 may be read, wherein the QR code may comprise information about a thickness and/or a magnetic permeability of the planar object 30. The camera 150 may further be used to capture large area images or optical features of the planar object 30, such as limiting points. Contrary to the embodiment of FIG. 18 in which the camera 150 is positioned centrally at the rotor 100, the camera 150 may also be positioned at another location, such as at the edge.

Figure 19:
FIG. 19 is a side view of a planar drive system.
Figure 19:
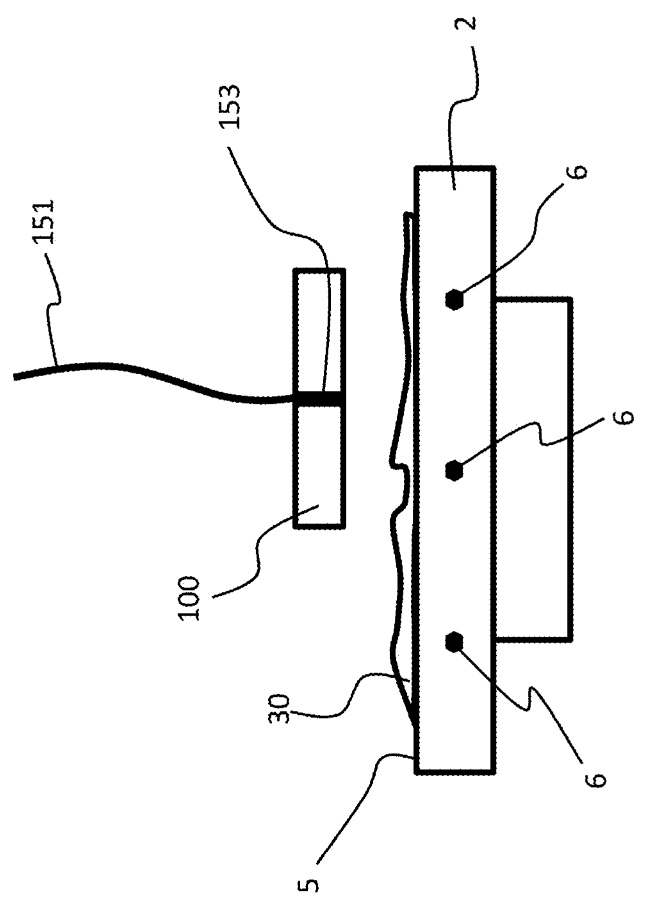

FIG. 19 shows a side view of a planar drive system 1. A sensor 153 comprising a data and power transmission 151 is arranged at the rotor 100. The rotor 100 and thus also the sensor 153 may be moved to any position on the stator surface 5. The sensor 153 may be used to determine a temperature of the planar object 30, a roughness or flatness of the planar object 30, an elasticity of the planar object 30, a thickness of the planar object 30, and/or a magnetic permeability of the planar object 30. The sensor 153 may further be a capacitive sensor. The thickness of the planar object 30 and/or the magnetic permeability of the planar object 30 may alternatively or in addition be determined using the magnetic field sensors 6. The data and power transmission 151 is shown to be wired, i.e., a cable, but may also be a wireless connection. Furthermore, the power transmission may be cabled and the data transmission may be wireless.

All parameters relevant for processing the planar object 30 (e.g. thickness, tool height, material) may be specified by an operator of the planar drive system via a parameter. Thus, it may be specified at which height the rotor 100 comprising the tool 120 must move in order to position the rotor 100 without processing, how far the rotor 100 must be lowered for processing the planar object 30, and with the aid of which force the rotor 100 must process the planar object 30. This may e.g. be specified to the controller 25.

The thickness of the planar object 30 may be automatically determined. For this purpose, a thickness determining process is started in which the rotor 100 is brought to maximum height to ensure that it does not touch the planar object 30, and then slowly descends. In this process, the rotor 100 is moved with the aid of a position control. This means that when the rotor 100 or the tool 120 starts to touch the planar object 30, a mechanical resistance occurs, thereby a position error becomes larger and thus a larger force has to be applied. This may then be evaluated to the effect that tool 120 or rotor 100 and planar object 30 are now in contact. If the force increases, it is therefore assumed that the contact has taken place. Since a position of the rotor 100 at this point in time is also known via the magnetic field sensors 6, the thickness of the material of the planar object 30 may thus be determined. It may be provided that the rotor 100 comprises a needle for this purpose, wherein the mechanical contact between the planar object 30 and the rotor 100 is established with the aid of the needle.

If the thickness of the planar object 30 varies at different points, i.e. has heights and depths, a one-time determination of the thickness is not necessarily suitable. In this case, e.g. the rotor 100 with sensor 153 described in connection with FIG. 19 may be used, wherein the sensor 153 may be embodied as a distance sensor (capacitive, inductive). As an alternative, the sensor 153 may be embodied for laser distance measurement. In this case, the sensor 153 may transmit data to the controller 25. The data from the sensor 153 may then be used directly to specify the height of the rotor 100.

Alternatively, the surface of the planar object 30 may be measured in its entirety using a completely external system, such as a camera system that may capture the entire surface of the material at once to create a height profile.

In almost all processing processes, the tool 120 is mounted under the rotor 100 or to the side of the rotor 100. Information about the tool 120 and, in particular, how it is arranged geometrically at the rotor 100 and what projection it has with regard to the rotor 100 may be taken into account by setting parameters when calculating the specified height.

Since the thickness of the planar object 30 and the projection of the tool 120 with regard to the rotor are known, the specified height may be selected in such a way that the planar object 30 is processed, but the stator module 2 is not touched by the tool 120. In addition, a mechanical protective layer, e.g. a thin stainless steel sheet, may be arranged on the stator module 2.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

| List of reference numerals | |
|---|---|
| 1 | Planar drive system |
| 2 | Stator module |
| 3 | Stator assembly |
| 4 | Coil group |
| 5 | Stator surface |
| 6 | Magnetic field sensor |
| 7 | Housing |
| 10 | Controller |
| 11 | Data line |
| 21 | First direction |
| 22 | Second direction |
| 23 | Third direction |
| 25 | Controller |
| 30 | Planar object |
| 100 | Rotor |
| 101 | Further rotor |
| 105 | Magnet unit |
| 111 | First side |
| 112 | Second side |
| 115 | Fixation rotor |
| 116 | Force-increasing rotor |
| 117 | Force-transmitting unit |

TABLE 1-continued

| List of reference numerals | |
|---|---|
| 120 | Tool |
| 121 | Cutting tool |
| 122 | First cutting edge |
| 123 | Second cutting edge |
| 128 | Punching tool |
| 131 | Pen |
| 133 | Stamp bed |
| 134 | Stamp |
| 136 | Adhesive-dispensing nozzle |
| 137 | Adhesive supply |
| 138 | Adhesive |
| 141 | Print head |
| 142 | Printing material supply |
| 145 | Driven tool |
| 146 | Power cable |
| 147 | Suction |
| 148 | Accumulator |
| 150 | Camera |
| 151 | Data and power transmission |
| 153 | Sensor |

What is claimed is:

1. A method for processing a planar object with the aid of a planar drive system, the planar drive system comprising:

at least a stator assembly comprising in each case a plurality of coil groups for generating a stator magnetic field, a stator surface above the stator assembly, and a rotor, the rotor comprising a plurality of magnet units for generating a rotor magnetic field, the rotor being movable above the stator surface with the aid of an interaction of the stator magnetic field with the rotor magnetic field in a first direction and/or a second direction and/or a third direction, wherein the first direction and the second direction are parallel to the stator surface, wherein the rotor is movable in the third direction perpendicular to the stator surface, wherein a tool is arranged at the rotor, and wherein the planar object is arranged between the stator surface and the rotor;

the method comprising the following steps:

energizing the coil groups in such a way that the rotor comprises a predetermined height above the stator surface in the third direction, energizing the coil groups in such a way that the rotor moves along a predetermined trajectory, wherein the tool and the planar object are in mechanical contact, thereby processing the planar object.

2. The method according to claim 1, wherein when energizing the coil groups in such a way that the rotor has a predetermined height above the stator surface in the third direction, a magnetic permeability of the planar object is taken into account.

3. The method according to claim 2, wherein a current intensity of the coil groups is adjusted based on the magnetic permeability of the planar object.

4. The method according to claim 1, wherein at first the coil groups are energized in such a way that the rotor moves in the third direction away from the stator surface, then the coil groups are energized in such a way that the rotor is located above the planar object, and then the coil groups are energized in such a way that the rotor moves in the third direction towards the stator surface until the tool and the planar object are in mechanical contact.

5. The method according to claim 1, wherein energizing the coil groups in such a way that the rotor moves along a predetermined trajectory is carried out in such a way that for at least one point of the trajectory a predetermined force is compared to a determined force, and energizing the coil groups is carried out in such a way that the determined force corresponds to the predetermined force.

6. The method according to claim 1, wherein a thickness of the planar object in the third direction is determined and the predetermined height is calculated using the thickness.

7. The method according to claim 6, wherein the thickness of the planar object in the third direction is determined with the aid of a sensor arranged at the rotor.

8. The method according to claim 1, wherein a fixation rotor is moved towards the stator surface with the aid of the coil groups in such a way that the planar object at the stator surface is restricted from moving in the first direction and/or second direction and/or third direction with the aid of the fixation rotor.

9. The method according to claim 1, wherein a force-increasing rotor acts upon the rotor with the aid of at least one force-transmitting unit to increase a force of the tool on the planar object in the third direction.

10. The method according to claim 1, wherein the tool comprises a cutting tool and processing the planar object comprises cutting.

11. The method according to claim 10, wherein:

the cutting tool comprises a first cutting edge and at least one second cutting edge, wherein the first cutting edge is arranged on a first side of the rotor and the second cutting edge is arranged on a second side of the rotor, wherein the first side and the second side of the rotor are opposite to each other, and wherein the rotor it tiltable for processing the planar object in such a way that the first cutting edge and/or the second cutting edge are in mechanical contact with the planar object.

12. The method according to claim 1, wherein the tool comprises a punching tool and the processing of the planar object comprises punching.

13. The method according to claim 1, wherein the tool comprises a stamp, wherein a stamp bed is arranged on the stator surface, and wherein processing the planar object comprises stamping.

14. The method according to claim 1, wherein the tool comprises a print head and the processing of the planar object comprises printing.

15. The method according to claim 1, wherein the tool comprises an adhesive-dispensing nozzle and the processing of the planar object comprises applying an adhesive.

16. The method according to claim 1, wherein the tool comprises a roller and the processing of the planar object comprises rolling.

17. The method according to claim 1, wherein the tool comprises a press and the processing of the planar object comprises pressing.

18. The method according to claim 1, wherein the tool comprises a pen and the processing of the planar object comprises writing or drawing.

19. The method according to claim 1, wherein the tool comprises a driven tool and the processing of the planar object comprises drilling and/or milling and/or engraving and/or sawing and/or grinding and/or perforating.

20. A planar drive system comprising:

at least a stator assembly respectively comprising a plurality of coil groups for generating a stator magnetic field, a stator surface above the stator assembly, and a rotor, the rotor comprising a plurality of magnet units for generating a rotor magnetic field, the rotor being movable above the stator surface with the aid of an interaction of the stator magnetic field with the rotor magnetic field in a first direction and/or a second direction and/or a third direction, wherein the first direction and the second direction are parallel to the stator surface, wherein the rotor is movable in the third direction perpendicular to the stator surface, and wherein a tool is arranged at the rotor;

and further comprising a controller which is configured to output a first signal, wherein on the basis of the first signal the coil groups are energized in such a way that the rotor has a predetermined height above the stator surface in the third direction and furthermore to output a second signal, and wherein on the basis of the second signal the coil groups are energized in such a way that the rotor moves on a predetermined trajectory; and wherein the tool and a planar object are in mechanical contact in the process and the planar object is processed as a result.

* * * * *